April 11, 1961    A. KRÜSSMANN    2,979,705
INDICATING CIRCUIT
Filed Feb. 19, 1957

INVENTOR.
Adolf Krüssmann
BY
Attorneys

United States Patent Office 2,979,705
Patented Apr. 11, 1961

2,979,705
INDICATING CIRCUIT

Adolf Krüssmann, Salierstrasse 3, Minden, Westphalia, Germany

Filed Feb. 19, 1957, Ser. No. 641,083

3 Claims. (Cl. 340—178)

The present invention relates to transducers that will indicate the square roots of values respectively represented by different positions of a movable input member, such as are highly useful, for example, in indicating the volume rate of flow corresponding to the measured differential in pressures at two locations spaced along a confined fluid flow path, usually with an intervening flow restricting orifice structure.

Heretofore it has been proposed to employ for such purposes null balance bridge systems with inductive transmitters and repeaters, with servo drive of the receivers also driving square root cams to extract the square roots of the condition values fed to the transmitters. It has also been proposed to use a "current scale" wherein negative feedback is performed by a force or position compensated dynamometer to indicate volume rate of fluid flow by current output.

In accordance with the present invention the transmitter of a transmitter-receiver system is provided with a receiver-controlling electrical spring loaded electromagnetic measuring device having a quadratic response characteristic and with a translator device that compares and develops a direct current of magnitude proportional to the difference between the magnitudes of indicating electrical conditions respectively controlled and variable by the transmitter and receiver, which current is fed to the quadratic electromagnetic receiver controlling device. By this system, the output member of the receiver controlling device positions the control member of the receiver in correspondence to the square of the energizing direct current, so that the system comes to an equilibrium condition with the magnitude of the direct current output of the translator corresponding to the square root of equal values represented by the positions of the transmitter and receiver control members.

Figure 1:
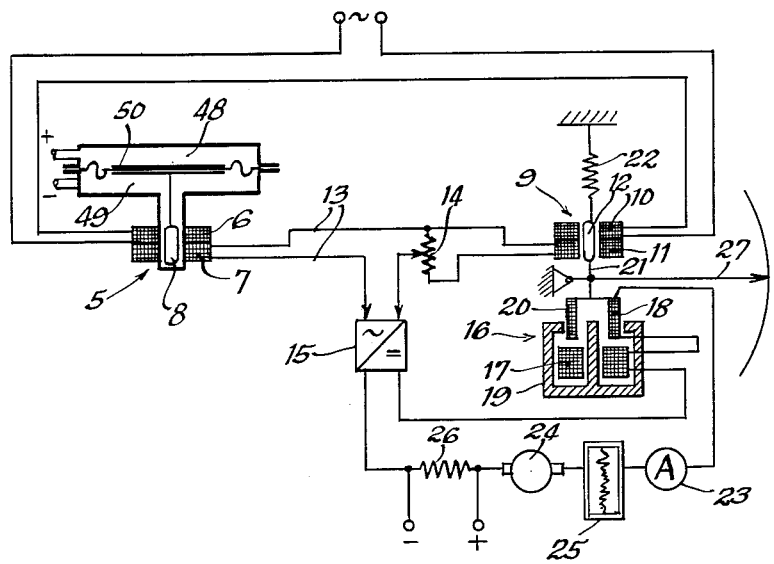
Fig. 1 is a schematic of a differential pressure flowmeter embodying the invention.

The indicating system of the invention comprises a transmitter and a receiver respectively having movable control members which are positionable to adjust magnitudes of electrical indicating conditions that they respectively control, in linear proportion to distances through which the control members are moved. In the specific arrangement shown in Fig. 1 the transmitter comprises a variable transformer 5 having primary and secondary windings 6, 7 and a core piece 8 that constitutes the input control member of the system and that is movable to vary magnitude of voltage induced in the secondary winding 7 in linear proportion to distance of its movement. Similarly, the receiver device comprises a variable transformer 9 having a primary winding 10, a secondary winding 11 and a movable core piece 12 that constitutes the control member of the receiver and that is movable to vary the output voltage induced in winding 11 in linear proportion to distance of its movement.

The primary windings 6, 10 preferably are connected in series for automatic temperature and energizing current variation compensation, and are connected across a substantially constant frequency current source.

The output voltage of secondary winding 7 of the transmitter transformer 5 is transmitted by leads 13. A selected portion of the output voltage of secondary winding 11 of receiver transformer 9 is picked off by a calibrating potentiometer 14 and its magnitude is compared with the magnitude of the transmitter output voltage at the control input of the translator device 15. Translator device 15, which may be an amplifier or a rectifier, such as that shown at page 113 of The Electronic Engineering Handbook edited by Batcher and Moulic and published by The Blakiston Company, Philadelphia, Pa. (1944), develops an output direct electric current of magnitude proportional to difference between the compared voltages applied to the control input.

The movable control member of the receiver device, core piece 12 of transformer 9, is positioned by operation of an electromagnetic device energized by the output current of translator device 15 and arranged to position that control member in accordance with a second power relation to the magnitude of that current. In Fig. 1 the electromagnetic device comprises a dynamometer 16 having a winding system composed of a pair of coils 17, 18 respectively mounted on a fixed magnetic circuit element 19 and a movable magnetic circuit element 20 and connected in series across the output of translator device 15 for energization by its direct output current. The movable magnetic circuit element 20 and the coil 18 mounted thereon are connected to the movable output member 21 of dynamometer 16. A bias spring 22, preferably of temperature compensated type, is connected to member 21 for exerting force in opposition to its movement by force developed by the electromagnetic system 17, 18, 19, 20.

It being known that force exerted by a spring loaded dynamometer of the arrangement shown varies with the square of the magnitude of current energizing its winding system it will be evident that the receiver device control member, core piece 12 will be positioned in correspondence to the square of the magnitude of the current output of translating device 15, and to the square of the difference between the output voltages of transformers 6 and 9, and consequently while the primary input member, core piece 8 is in a certain position, representing a value, the system will come to a balanced condition with the magnitude of the output current of translating device 15 corresponding to the square root of that value. Consequently the square root of the value can be detected, indicated and/or recorded by any one or more of an ammeter 23, an integrating current meter 24 and a recorder 25, series connected between translating device 15 and the dynamometer winding system 17, 18. For voltage-responsive control purposes a voltage drop developing electrical resistance element 26 may be series connected between device 15 and system 17, 18.

The system may be designed for high accuracy, since the moving part of the dynamometer may have a total displacement range of the order of one millimeter, rendering the gap between the magnetic circuit elements practically constant, so that no appreciable error arises from the effect of varying gap width in correspondence of force to intensity of energizing current. The translator device 15, if an amplifier, readily and practically may be so designed as to produce a maximum output current magnitude in response to an error condition as little as one-tenth of one percent. The displacement of the moving parts of the dynamometer and receiver control member may be used for direct indication by an indicator needle 27 coupled direct to output member 21, with provision for mechanical amplification of its movement, shown by the different lever arms of needle 27, and suitable calibration of a scale with which the needle cooperates to indicate either the value fed to the transmitter device or the square root of that value.

Figure 2:
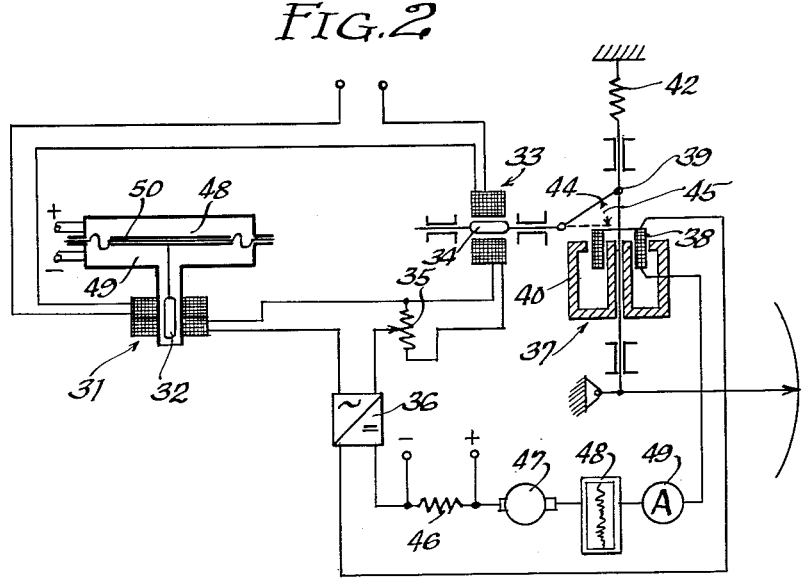
Fig. 2 is a schematic of such a flowmeter embodying a modified form of the invention.

Fig. 2 shows a system embodying the invention and including a modified form of electromagnetic receiver control member driving device, which device eliminates hysteresis effect of the magnetic dynamometer circuit elements, thereby presenting an advantage in certain fields of service.

As in the system of Fig. 1, the device comprises a transmitter-receiver circuit whereof the transmitter and receiver devices again are shown as comprising a variable transformer 31 having a movable core piece 32 and a variable transformer 33 having a movable core piece 34. As in the system of Fig. 1, a portion of the secondary voltage of the receiver transformer 33 is picked off by a calibrating potentiometer 35 and compared with the secondary, value-representing voltage output of the transmitter potentiometer 31 at the control input of the translator device 36 which again is an alternating to direct current translating device such as a rectifier, or more usually, an amplifier-rectifier.

The electromagnetic receiver core-driving device is shown in Fig. 2 as a moving coil force balance device 37 provided with a winding system that comprises a coil 38 that is supported on an axially movable output member 39, positioned for axial movement in the annular gap and field of a permanent magnet 40, and connected with the output of translator device 36 similar to translator device 15 to develop a force that varies linearly with magnitude of current energizing coil 38, and therefore with the difference between magnitudes of voltage outputs of the transmitter and receiver devices, transformers 31, 33. A spring 42 resists movement of member 39 in the direction corresponding to increase of current energizing winding 38, so that position of member 39 corresponds to the magnitude of current energizing winding 38. To inject the squaring function into the receiver device drive, whereby current energizing winding 38 corresponds to the square root of the value represented by the position of the control input member core piece 32, a squaring linkage is connected with the electromagnetic device output member 39 and the receiver device control element, core piece 34, for moving the latter through distances varying with the square of distances moved by member 39. This linkage, which is of satisfactory accuracy in the assembly shown, due to the extremely small range of movement of output member 39, of the order of one millimeter, is arranged according to the known law of Pythagorus. It comprises a link 44 pivotally connected to member 39 and the movable assembly of core piece 34, the two of which are suspended for rectilinear movement in paths that are perpendicular, with the one of the limits of travel of the pivotal connection between member 39 and link 44 that represents maximum energization of winding 38 positioned at or near alignment with the travel path of the axis of the core piece assembly, and with the other limit of travel spaced from the first axis at an angle of less than twenty degrees about the axis of pivotal connection between link 44 and the core piece assembly. This maximum angle is indicated at 45 in Fig. 2. In accordance with the mentioned law of Pythagorus the second power relation between members so connected and within the indicated angular limit is within one-tenth of one percent.

It will be seen that the electrical and mechanical aspects of the arrangement of Fig. 2 are closely similar to those of Fig. 1. Upon repositioning of the input control member 32 to represent a new value, an error voltage will be applied to translator 36 which will correspondingly alter the magnitude of current energizing winding 38 and correspondingly repositioning member 39. Movement of 39 will be squared by link 44, so that a new equilibrium condition will be established wherein current output of translator 36 will be proportional to the square root of the value represented by the positions of the control members of the transmitter and receiver devices 31, 33. As in Fig. 1, any one or more of a resistance element 46, an integrator 47, a recorder 48 and an ammeter 49 may be series connected between translator device 36 and winding 38.

A field of important use to which arrangements in accordance with the invention are applicable is that of direct indication of volume rate of fluid flow measured by differential between pressures at two locations spaced along an enclosed flow path, usually with an intervening flow-restricting orifice. Since such differential varies with the square of the volume flow rate, the second power relationship between the magnitude of current output of the translating device affords a square root relationship between a differential in pressures so detected and the magnitude of output current of the translator device. For this purpose a conventional detector device is shown in each of Figs. 1 and 2 combined with the arrangements previously described. Such translator may comprise the illustrated force balance diaphragm device having a pair of chambers 48, 49 for respective connection to a flow line at spaced locations, whereby the intervening diaphragm 50 is positioned in accordance with the magnitude of difference between pressures effective at the different locations and in the different chambers. In each of Figs. 1 and 2, diaphragm 50 is connected with the transmitter device control member, core piece 8 and core piece 32, so that the latter is positioned by the diaphragm and in accordance with the magnitude of the differential pressure.

From the foregoing the construction, operation and many advantages of the herein disclosed invention will be apparent to those skilled in the art, and it will be understood that the invention and its bounds are to be ascertained solely from the appended claims, and that, within the scope of the claims many changes, alterations and modifications of the specific exemplary disclosures may be made.

I claim:

1. An electrical indicating system comprising: an inductive transmitter having a control member movable in accordance with a magnitude to be indicated to provide a corresponding output voltage; an inductive receiver electrically coupled with the transmitter and having a control member movable to provide an output voltage opposing the output voltage of said transmitter; a spring biasing said receiver control member in one direction and arranged to provide a biasing force at each position of the control member of the receiver corresponding to the magnitude being indicated; current producing means electrically coupled to each of said transmitter and receiver to produce at all times a current proportional to the difference between the output voltages of said transmitter and receiver; dynamometric moving coil means connected with said current producing means and responsive to said current to move the control member of said receiver to a position related to the square of said current wherein the output voltage of the receiver is a function of the square of said current; and means indicating a function of said current corresponding to said magnitude being indicated.

2. The electrical indicating system of claim 1 wherein the dynamometric means includes a fixed coil and a movable coil, the movable coil being mechanically connected to the control member of the receiver in opposition to said spring and both coils being connected in series with said current producing means.

3. The indicating system of claim 1 wherein the dynamometric means includes a link having one end movable directly with the moving coil and an opposite end connected to said receiver control member, and means constraining the movement of said ends in mutually perpendicular, rectilinear paths.

References Cited in the file of this patent

UNITED STATES PATENTS

| | | |
|---|---|---|
| 2,330,427 | Hornfeck | Sept. 28, 1943 |
| 2,662,540 | Rutherford et al. | Dec. 15, 1953 |
| 2,672,151 | Newhold | Mar. 16, 1954 |
| 2,688,253 | Markson | Sept. 7, 1954 |
| 2,737,641 | Macgeorge | Mar. 6, 1956 |
| 2,780,101 | Kinkel | Feb. 5, 1957 |
| 2,794,971 | Hornfeck | June 4, 1957 |
| 2,822,689 | Bonapace | Feb. 11, 1958 |

FOREIGN PATENTS

| | | |
|---|---|---|
| 751,852 | Great Britain | July 4, 1956 |